United States Patent
Cok et al.

(10) Patent No.: US 8,761,523 B2
(45) Date of Patent: Jun. 24, 2014

(54) GROUP METHOD FOR MAKING EVENT-RELATED MEDIA COLLECTION

(75) Inventors: Ronald Steven Cok, Rochester, NY (US); Jon Allyn Campbell, Oakland, CA (US); Neil Cannon, Bovingdon (GB); Mark S. Cook, Greenbrae, CA (US); Joseph Anthony Manico, Rochester, NY (US); Peter Karl Traeg, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 226 days.

(21) Appl. No.: 13/300,854

(22) Filed: Nov. 21, 2011

(65) Prior Publication Data

US 2013/0129232 A1    May 23, 2013

(51) Int. Cl.
*G06K 9/62*       (2006.01)

(52) U.S. Cl.
USPC ........................................ 382/224

(58) Field of Classification Search
USPC ........ 382/225, 284, 305; 348/231.3; 707/737, 707/E17.023
See application file for complete search history.

(56) References Cited

U.S. PATENT DOCUMENTS

| | | | |
|---|---|---|---|
| 7,035,467 B2 | 4/2006 | Nicponski | |
| 7,085,818 B2 | 8/2006 | Brown et al. | |
| 7,233,933 B2 | 6/2007 | Horvitz et al. | |
| 7,366,994 B2 | 4/2008 | Loui | |
| 7,539,489 B1 | 5/2009 | Alexander | |
| 7,663,671 B2 | 2/2010 | Gallagher et al. | |
| 7,730,036 B2 | 6/2010 | Blose et al. | |
| 8,447,769 B1 * | 5/2013 | Paris et al. | 707/758 |
| 8,510,383 B2 * | 8/2013 | Hurley et al. | 709/205 |
| 8,599,801 B2 * | 12/2013 | Baio et al. | 370/338 |
| 2007/0008321 A1 | 1/2007 | Gallagher et al. | |
| 2007/0115373 A1 * | 5/2007 | Gallagher et al. | 348/231.3 |
| 2008/0304808 A1 | 12/2008 | Newell et al. | |
| 2010/0082624 A1 * | 4/2010 | Martin et al. | 707/737 |
| 2010/0111428 A1 | 5/2010 | Yu et al. | |
| 2013/0040660 A1 * | 2/2013 | Fisher et al. | 455/456.1 |

* cited by examiner

*Primary Examiner* — Daniel Mariam

(57) ABSTRACT

A method for making a media collection associated with an event having an event location, includes receiving a specification of members in a group; using a processor to receive one or more media elements from each of a plurality of media-capture devices, each media element having a capture location; defining the event in response to receiving one or more media-capture-device signals having the event location from group members; and associating media elements having the event location received at the same time or after the event definition with a stored media event collection corresponding to the event for subsequent use.

19 Claims, 13 Drawing Sheets

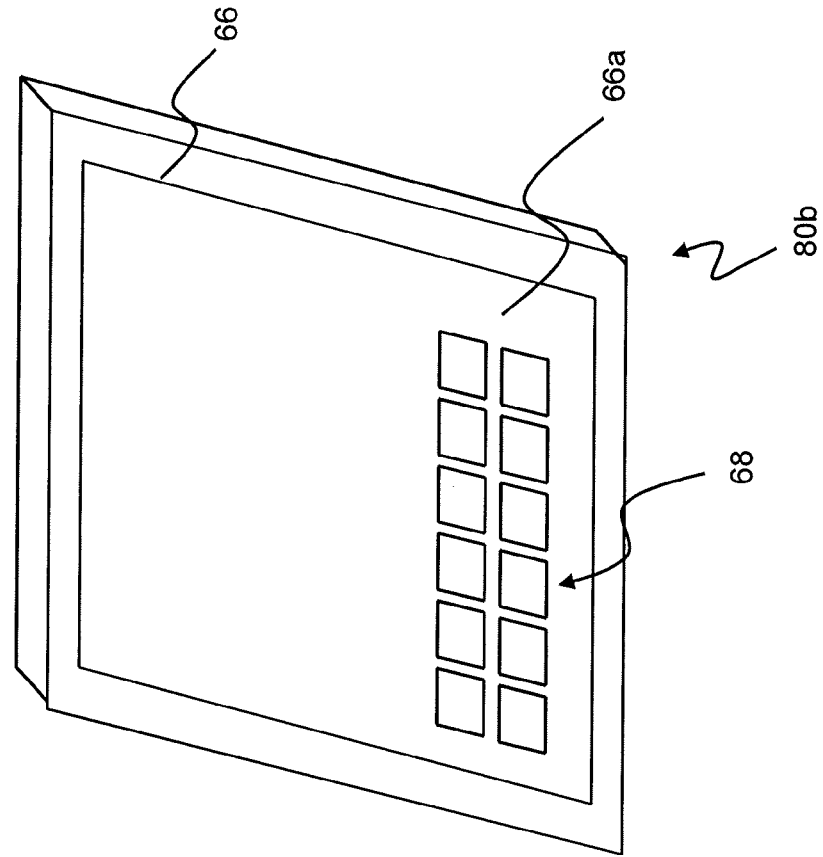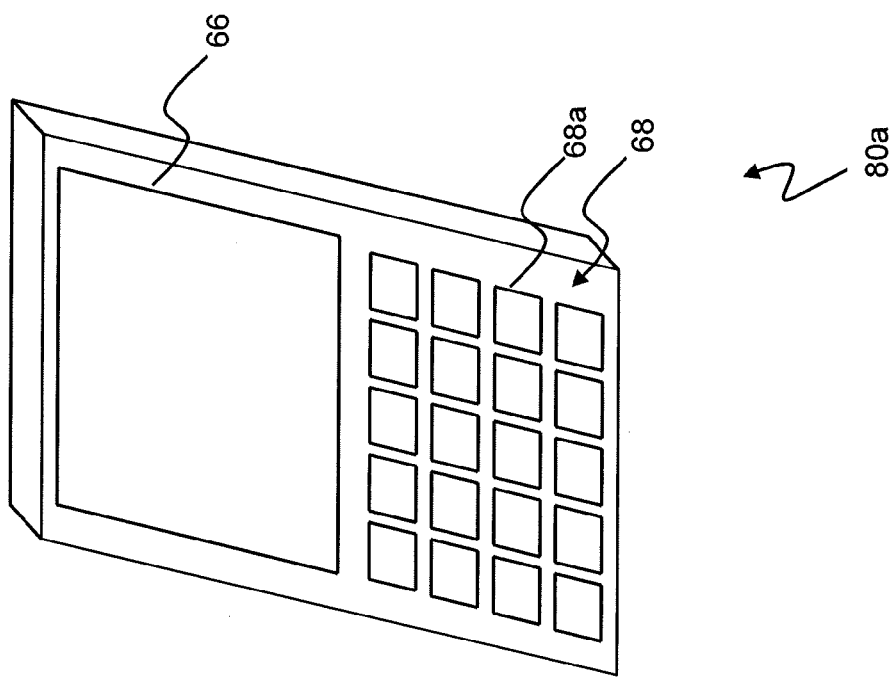
FIG. 8

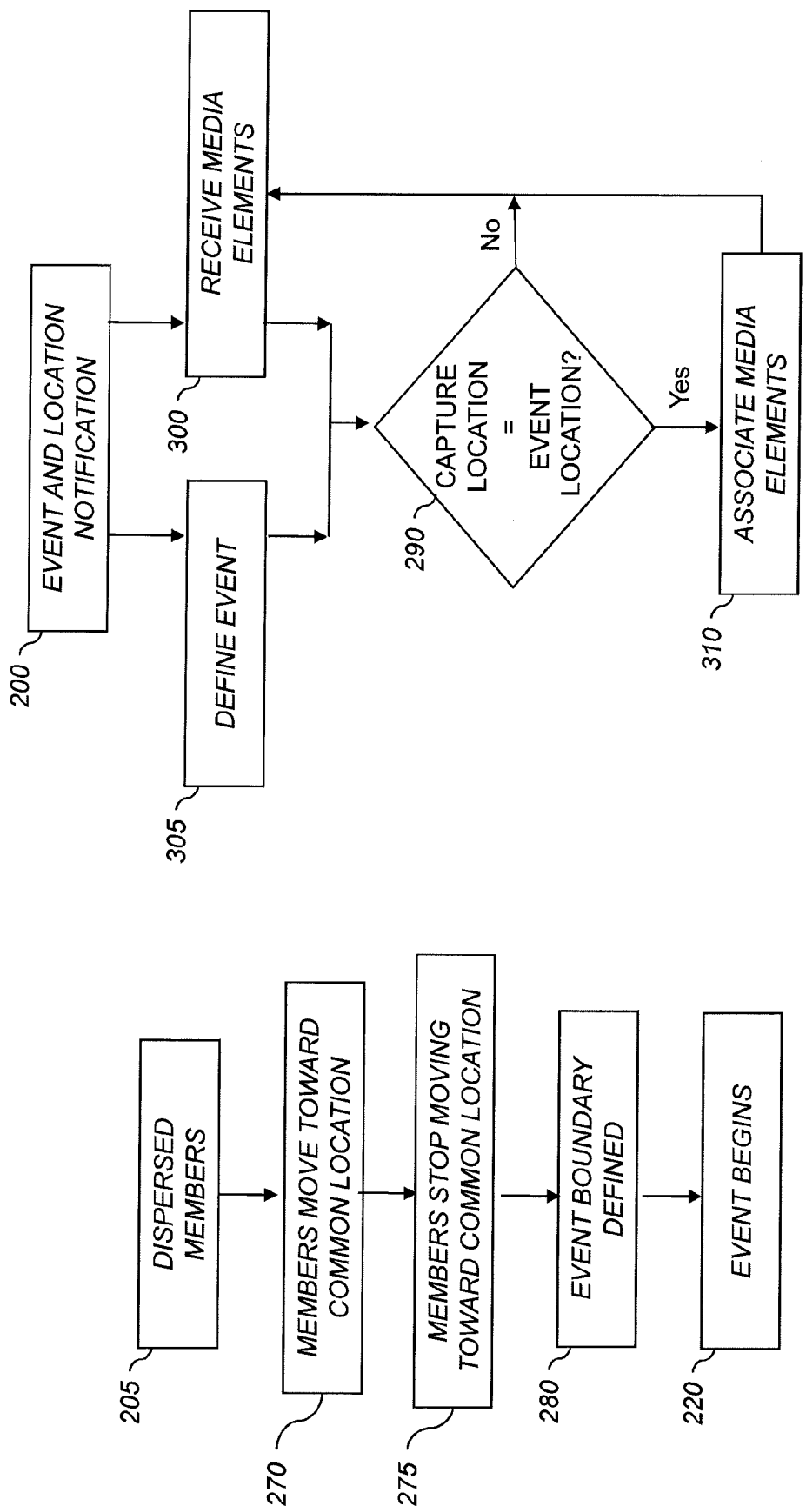

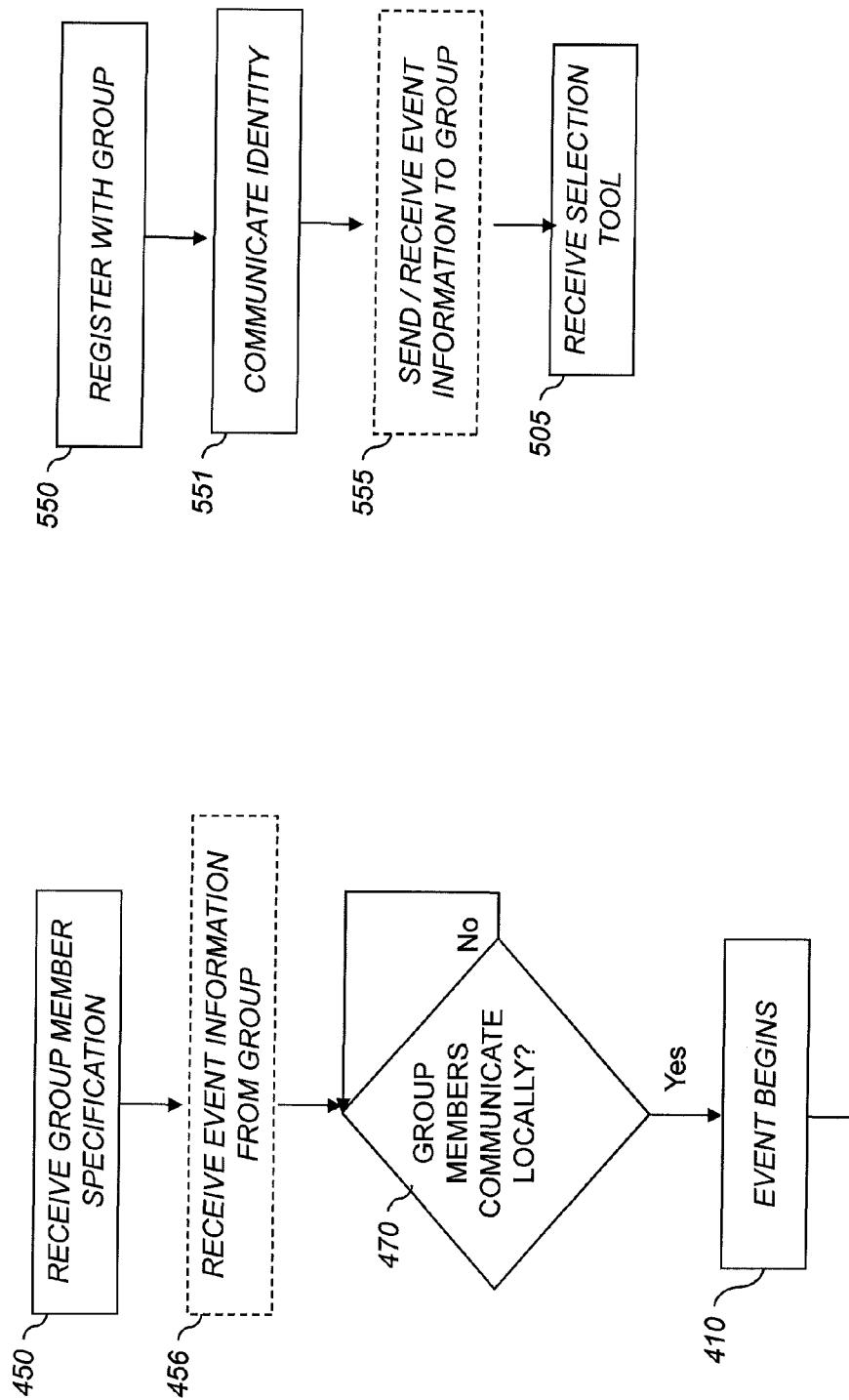

GROUP METHOD FOR MAKING EVENT-RELATED MEDIA COLLECTION

CROSS-REFERENCE TO RELATED APPLICATIONS

Reference is made to commonly-assigned, co-pending U.S. patent application Ser. No. 13/300,826 filed concurrently herewith, entitled "METHOD FOR MAKING EVENT-RELATED MEDIA COLLECTION" by Ronald S. Cok, et al., and co-pending U.S. patent application Ser. No. 13/300,889 filed concurrently herewith, entitled "USER METHOD FOR MAKING EVENT-RELATED MEDIA COLLECTION", by Ronald S. Cok, et al, the disclosures of which are incorporated herein.

FIELD OF THE INVENTION

The present invention relates to the specification of recorded events and to compiling media collections related to the specified events.

BACKGROUND

Products that include media such as still images, video, audio and text are a popular keepsake or gift for many people. Such products typically include an image captured by a digital camera that is inserted into the product and is intended to enhance the product, the presentation of the image, or to provide storage for the image. Examples of such products include picture albums, photo-collages, posters, picture calendars, picture mugs, t-shirts and other textile products, picture ornaments, picture mouse pads, and picture post cards. Products such as picture albums, photo-collages, and picture calendars include multiple images. Products that include multiple images are designated herein as photographic products, image products, or photo-products.

Image-based products are frequently designed to represent and record a specific event in a person's life. Examples include weddings, graduations, parties, and vacations. In some situations, all of the images associated with an event are made by one individual who participates in the event or is responsible for recording the event. In other situations, multiple event participants record images associated with the event so that the situation is more complex. For example, different participating individuals can understand the event differently, can participate in different portions of the event at different times, can experience the event in different ways, or can record different parts of the event.

Making image-based products as event keepsakes or mementos, for example, as is commonly done with photo-albums, is often difficult, time-consuming, and tedious. When images from multiple event participants are included in the image-based product, the task becomes even more difficult. The number of images can be very large, collecting the images can be difficult, selecting representative images of high quality without selecting redundant images can be time-consuming, and determining which images are relevant to the event can be problematic.

Imaging tools for automating the specification of photographic products are known in the prior art. For example, tools for automating the layout and ordering of images in a photo-book are available from the Kodak Gallery as are methods for automatically organizing images in a collection into groups of images representative of an event. It is also known to divide groups of images representative of an event into smaller groups representative of sub-events within the context of a larger event. For example, images are segmented into event groups or sub-event groups based on the times at which the images in a collection were taken. U.S. Pat. No. 7,366,994 describes organizing digital objects according to a histogram timeline in which digital images are grouped by time of image capture. U.S. Patent Publication No. 2007/0008321 describes identifying images of special events based on time of image capture. U.S. Pat. No. 7,663,671 describes location-based image classification for images with map location metadata and is incorporated by reference herein its entirety.

Semantic analyses of digital images are also known in the art. For example, U.S. Pat. No. 7,035,467 describes a method for determining the general semantic theme of a group of images using a confidence measure derived from feature extraction. Scene-content similarity between digital images can also be used to indicate digital-image membership in a group of digital images representative of an event. For example, images having similar color histograms belong to the same event.

U.S. Patent Publication No. 2008/0304808 describes a method and system for automatically making an image product based on media assets stored in a database. A number of stored digital media files are analyzed to determine their semantic relationship to an event and are classified according to requirements and semantic rules for generating an image product. Rule sets are applied to assets for finding one or more assets that are included in a story product. The assets, which best meet the requirements and rules of the image product are included.

U.S. Pat. No. 7,730,036 describes event-based digital content record organization so that retrieval of such digital content in a manner meaningful and logical to users is achieved. In this regard, an event is defined by event boundaries, including a span of time, a geographic area, an acquirer of digital content, or a subject of digital content. This approach relies upon the post-capture analysis and sorting of collected images.

U.S. Pat. No. 7,085,818 describes providing information on proximate events based on current location and user availability. A determination is made of a current location of the wireless device and whether the current location is within a proximity to a target location. If the current location is within the proximity to the target location, information is transmitted. This information is used to schedule events for a user.

U.S. Pat. No. 7,233,933 describes cross-device monitoring, reasoning and visualization for providing status and forecasts of user's presence and availability. Predictive models are used to make forecasts of a user's presence and availability to facilitate collaboration and communications between entities such as parties to a communication. U.S. Pat. No. 7,539,489 discloses apparatus and methods facilitating a distributed approach to performance and functionality testing of location-sensitive wireless systems and equipment.

U.S. Patent Application Publication No. 2010/0111428 describes using image and location information to recognize an event depicted in an image from the image and location information associated with the image. The method includes acquiring the image and its associated location information, using the location information to acquire an aerial image, using the image and the acquired aerial image to identify the event, and storing the event in association with the image.

While these methods are useful for sorting images into event groups, temporally organizing the images, assessing emphasis, appeal, or image quality, or recognizing individuals in an image, there remains a need for improved methods of automating the specification and collection of images related to an event having a plurality of individual participants.

SUMMARY OF THE INVENTION

In accordance with the present invention, there is provided a method for making a media collection associated with an event having an event location, comprising:

receiving a specification of members in a group;

using a processor to receive one or more media elements from each of a plurality of media-capture devices, each media element having a capture location;

defining the event in response to receiving one or more media-capture-device signals having the event location from group members; and associating media elements having the event location received at the same time or after the event definition with a stored media event collection corresponding to the event for subsequent use.

Various embodiments of the present invention have the advantage of forming media collections associated with an event without requiring analysis of the media elements in the media collection. Thus, the media collections associated with the event are more accurate and complete, and media element analysis, such as image processing, is rendered unnecessary.

These, and other, aspects of the present invention will be better appreciated and understood when considered in conjunction with the following description and the accompanying drawings. It should be understood, however, that the following description, while indicating embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and interchanged with, elements of other described embodiments. Many changes and modifications can be made within the scope of the present invention without departing from the spirit thereof, and the invention includes all such modifications. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features, and advantages of the present invention will become more apparent when taken in conjunction with the following description and drawings wherein identical reference numerals have been used, where possible, to designate identical features that are common to the figures, and wherein:

FIG. 8 illustrates perspectives of mobile communication devices useful with the present invention;

FIG. 12 is a flow diagram illustrating a method according to an embodiment of the present invention;

FIG. 13 is a flow diagram illustrating a method according to another embodiment of the present invention;

FIG. 16 is a flow diagram illustrating a method for groups according to an embodiment of the present invention; and FIG. 17 is a flow diagram illustrating another method for groups according to another embodiment of the present invention.

DETAILED DESCRIPTION OF THE INVENTION

Figure 1:
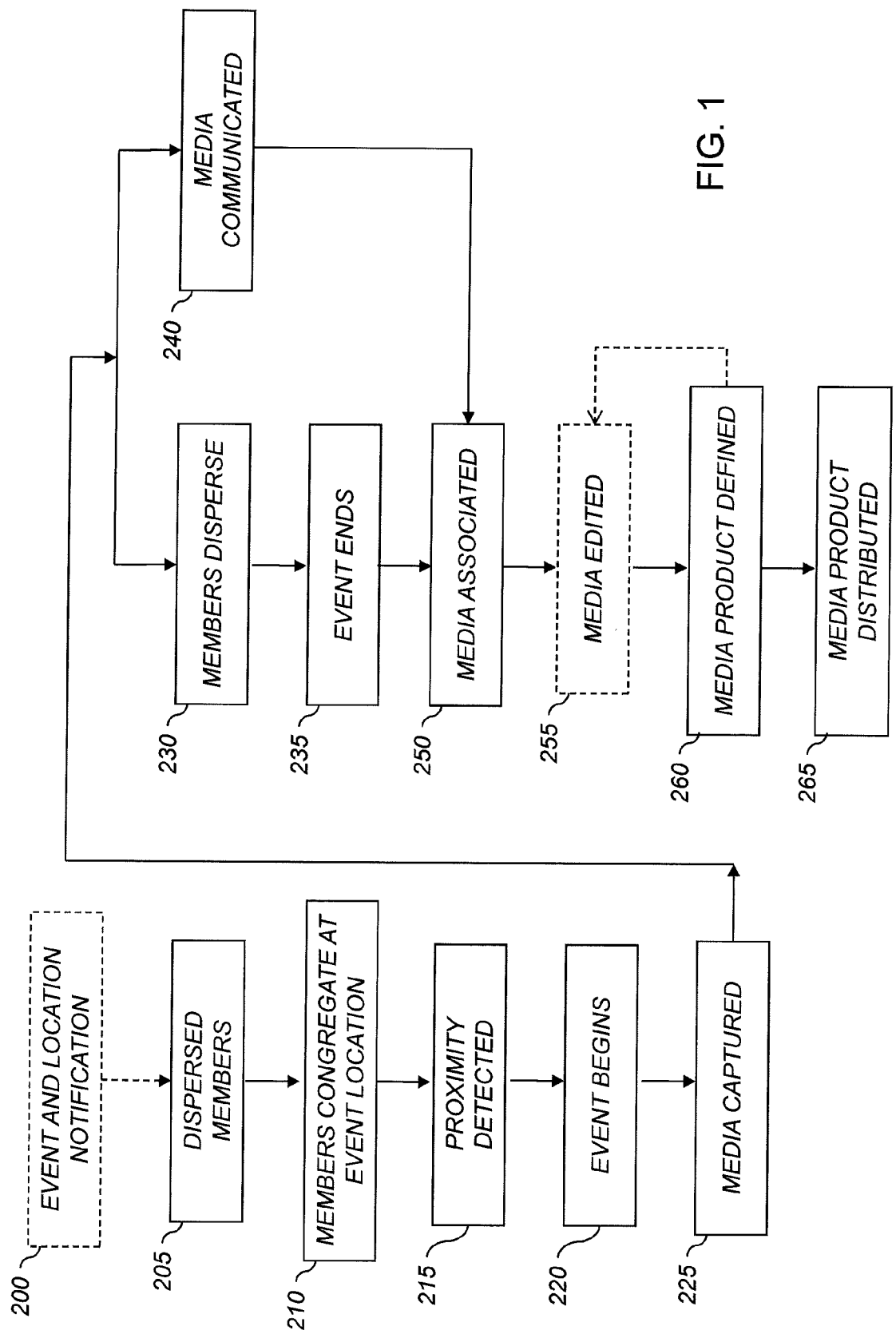
FIG. 1 is a flow diagram illustrating a method according to an embodiment of the present invention.

Various embodiments of the present invention are directed toward various methods for making a media collection associated with an event by defining events in response to media-capture device signals having location information received from individuals participating in the event, recording the event with media-capture devices, and associating recorded media elements with the event in stored media event collections for subsequent use.

As used herein, media are information elements that communicate information to users. Media can take a variety of human-understandable modalities such as images, audio, and text. A media element is information that includes one or more information components, for example, one or more of a digital still image, a digital video image sequence, audio information, or text information. A media element can include a plurality of components, for example any combination of a digital still image, a digital video image sequence, audio information, or text information.

In one embodiment, the media element is stored or communicated as a digital file or as one or more associated digital files. In another embodiment, components of the media element having location information describing the geographical location at which the components were captured or having time-of-capture information describing the time at which the components were captured are included as metadata in a common file with the components. Alternatively, such location or time-of capture information is stored in separate files associated with files in which other components of a corresponding media element are stored. In an embodiment, captured media are stored as media-element components in a digital storage system.

A media-capture device is a device, for example, an electronic device that captures media, for example communication media such as digital images, videos, audio, or text. The media-capture device is, for example, a digital camera or a cellular telephone that incorporates a digital camera. In an embodiment, the media-capture device is a smart phone that incorporates a digital camera and is capable of communicating digital information, such as digital images acquired with the incorporated digital camera, with a communication network, such as the internet or a cellular telephone network. Such devices are known in the telecommunications and imaging arts. The media-capture device can incorporate a clock for determining the time of capture of a media-element component, such as an image, and associating the capture time with the media-element component. Suitable electronic digital clocks are well known in the digital electronics industry. The media-capture device can incorporate ways of determining the capture location of a media-element component, such as an image, and associating the capture time with the media-element component. For example a GPS (global positioning system) device is incorporated into the media-capture device and used to determine the capture location of a media-element component. Alternatively, cellular telephone communication signals are used to determine the capture location of a media-element component. Determined capture locations or capture times are associated with the corresponding media-element components. Other ways of recording location can also be used, such as a record input by a user, other individual, or transmitted from other devices having location information (e.g. nearby computers communicating location information).

The media-capture-device signal includes a location signal, for example, obtained from a GPS device incorporated into the media-capture device. Such media-capture-device signals are communicated through a wireless or wired communication channel, for example, through cellular telephone communication channels or through the internet from hardware and software incorporated into the media-capture device using electronic device, processors, communication electronics, and software known in the art. The media-capture-device signals are communicated to a receiver, for example a computer server.

In one embodiment of the present invention, the media-capture-device signals include a media element including the capture location of the media element. The event is defined in response to receiving the media elements having the event location and the received media elements are associated with the stored media-event collection corresponding to the event for subsequent use. In this embodiment, the event definition can occur after the media elements are acquired. For example, a group of users can congregate at an event location, acquire images with their smart phones while at the event location, and then disperse. The images are later uploaded to the server, which then defines the event in response to the event location found with the acquired images, and associates the acquired images in the media collection. Alternatively, the images are transmitted to the server as the images are acquired. The server then receives the images, defines the event in response to the event location found with the acquired images while the event is in progress, and associates the acquired images in the media collection.

In an alternative embodiment, the media-capture-device signals are communicated separately from a media element. In this case, the media-capture device includes an identifier associated with its location and with media elements acquired by the media-capture device. When the media-capture-device signals indicate proximity of one or more identified media-capture devices to a pre-defined event location or a common location, an event is defined and media elements acquired by and identified with the media-capture device are associated into the media-event collection. When the media-capture device is no longer proximate to the event location, the media elements acquired by and identified with the media-capture device are no longer associated with the event and are not included in the media-event collection. In this embodiment, it is helpful if a capture time is included with the media element so that any media elements acquired and identified with the media-capture device while the media-capture device was proximate to the location are associated with the media event collection, even if the media element is communicated when the media-capture device is no longer at the event location. Media elements acquired at the location at a time different from the event time are not included. For example, a group of users with smart phones (media-capture devices) can congregate at an event location and transmit identified media-device capture signals indicating proximity to the event location to define an event. The users acquire images with their smart phones while at the event location and then disperse. The images are identified with the smart phones and uploaded to a server, either as the images are acquired or later. The server compares the capture time of the identified images to the location of the corresponding media-capture device at that time to determine whether the received images are part of the event. Those images that match the time and media-capture device are associated with the media-event collection. Those media recorded at the location but at a time different from the event time are excluded.

Referring to FIG. 1, in an embodiment of the present invention, members of a group are geographically dispersed in step 205. Subsequently, the members congregate at an event location in step 210, for example by traveling to the event location. The proximity of the members is detected in step 215 with media-capture device signals and, in response, an event is defined and begins in step 220. The event is recorded in step 225 by one or more group members by employing media-capture devices to capture media elements, such as images, videos, audio, or text such as written descriptions. The members eventually disperse in step 230, for example by traveling to separate destinations, and the event ends in step 235. When an event ends, or is terminated, the stored media-event collection is completed so that additional media elements having a capture time or capture location different from the event are not added to the event. The captured media elements are communicated and received at the same time or after the event definition in step 240. Media elements can be received after the event ends. The received event media are associated and stored into a media-event collection in step 250 for subsequent use. The media elements are received, for example by a computer server connected to a communication network such as the internet and accessible through wired or wireless communication channels, such as local area networks, cellular communication networks, and point-to-point networks. Such communication channels can include: Ethernet, WiFi, or Bluetooth communication.

In an optional step, the members can edit or delete captured media elements in step 255. A product incorporating one or more of the media elements is defined in step 260. The media product can also be edited by members so that a final media product that incorporates desired media elements in a desired way is specified and then distributed in step 265. The media product can include one or more of the media collection, a reference to the media collection, a product including at least a portion of the media collection, or a reference to a product including at least a portion of the media collection to one or more of the group members.

Members' proximity are detected with media-capture device signals in various ways according to various embodiments of the present invention. In one embodiment, the members capture media, such as images, that include capture location information and identifying media-capture device information. The media-capture device signal in this embodiment is a media element. When the capture locations from different media-capture devices indicated in different media elements match the event location, the event begins. Alternatively, the media-capture device signal can include a location signal separate from a media element, for example a communication of a location derived from a GPS device or extracted from cellular telephone signals in a media-capture device having cellular communications capability. Similarly, an event can be terminated in response to the geographic dispersal of the members, as indicated by the media-capture device signals indicating the location of their media-capture devices. The event termination can be detected by receiving media-capture-device signals from the one or more media-capture devices having locations different from the event location or different from a common location.

In another embodiment, proximity is determined by direct communication between media-capture devices, for example through Bluetooth point-to-point communications, direct optical communications such as infrared beams, or through local area networks. Once detected, proximity is communicated to remote device or to other media-capture devices.

The degree of proximity needed to establish an event can be related to the type and capabilities of media-capture devices. For example, an event can include participants who can see and record each other. If the participants' media-capture devices can record the participants in an area, the participants are sufficiently proximate to each other to define an event. If the participants' media-capture devices cannot record the participants at an area, the participants are not sufficiently proximate to each other to define an event. For example, media-capture devices including digital cameras having zoom lenses can enlarge the area considered to specify adequate participant proximity for an event in comparison to media-capture devices including digital cameras that do not have zoom lenses.

The media-capture devices of event participants can receive an event signal including a common-location indicator in response to such direct communication, for example from a remote system (such as a networked computer server from a service provider that receives media-capture device signals), or directly from a group member engaged in the direct communication. Such communication methods are known in the communications art. The media-capture device signals can include information indicating proximity by direct communication and are communicated to remote systems that then communicate an event signal to the directly communicating participants.

In an embodiment of the present invention, an event coordinator specifies an event location, a time, or a time span in step 200 and communicates a notification to an event service or members. When the media-capture-device signals indicate that media-capture devices are proximate to the event location, the event is defined and media elements acquired at the event location are associated with the media-event collection. Events end when the media-capture-device signals no longer include information corresponding to the event location. Thus, media elements acquired by the media-capture devices no longer have a capture location corresponding to the event location and are not included in the media-event collection.

In another embodiment of the present invention, an event location is not pre-defined. Identified media-capture devices are associated into a group, for example a family or group of friends. When the media-capture-device signals indicate that media-capture devices are proximate to each other at a common location, an event is defined and media elements acquired at the event location are associated with the media-event collection. In this example, events occur whenever the group congregates with their media-capture devices at the same location. When the group disperses, the event ends.

Figure 2:
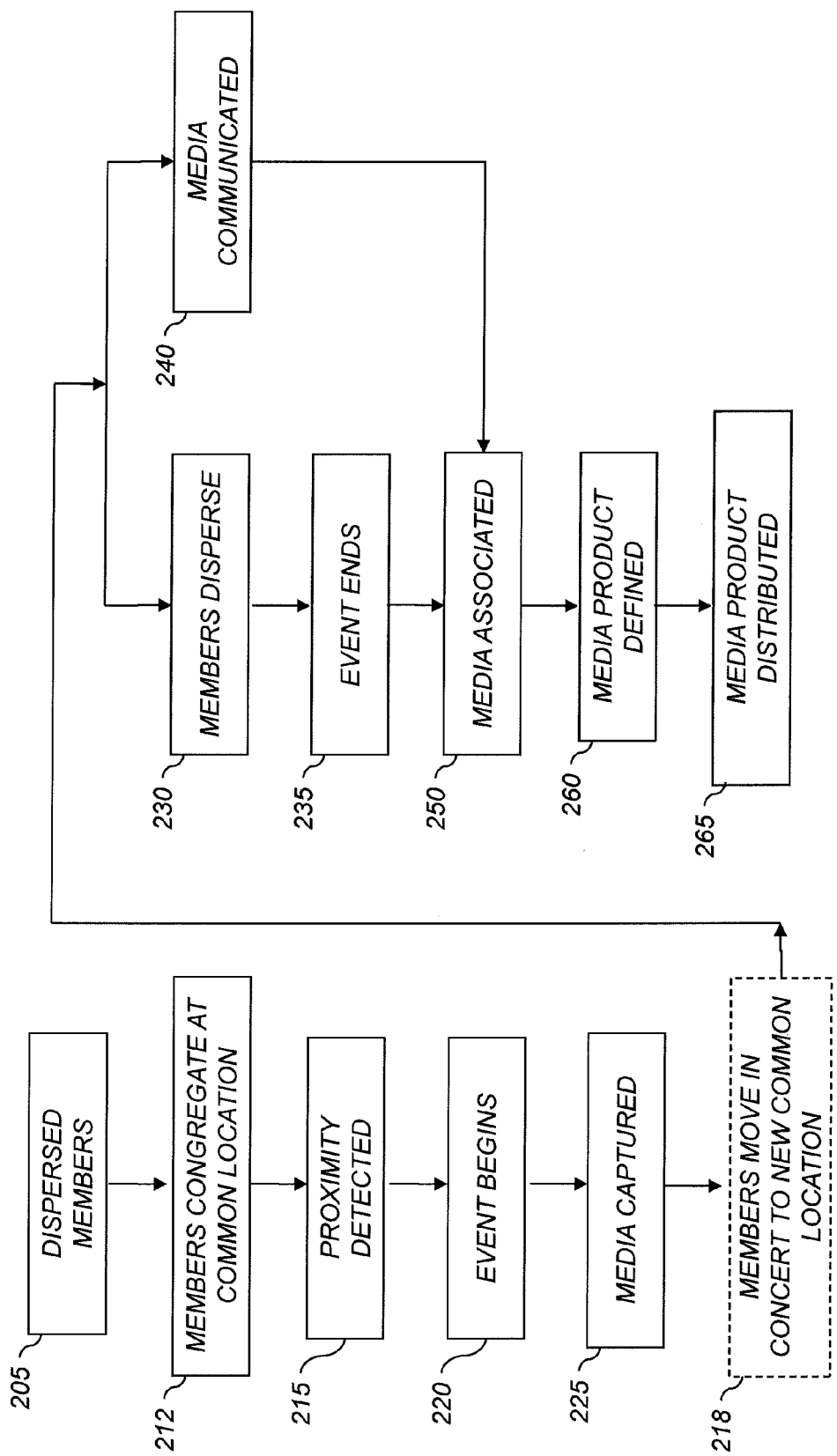
FIG. 2 is a flow diagram illustrating a method according to another embodiment of the present invention.

Referring to FIG. 2, in an embodiment of the present invention, members of a group are geographically dispersed in step 205. Subsequently, the members congregate at a common location in step 212, for example by traveling to the same location. The common location can occur spontaneously, for example members can encounter each other unexpectedly at a favorite location of the members. The proximity of the members is detected in step 215 with media-capture device signals and, in response, an event is defined and begins in step 220. The event is recorded in step 225 by one or more group members by employing media-capture devices to capture media elements, such as images, videos, audio, or text such as written descriptions. Optionally, the members move in concert to a new common location in step 218. Hence, an event location need not be fixed (even if pre-specified in step 200 of FIG. 1), but can vary over time. For example, members might meet at a common public location, such as a shopping area, and then decide to move together to a restaurant or a private home to continue the event. The movement of the members together as a group can be detected by analyzing the absolute and relative locations of their media-capture device signals to find that a plurality of media-capture-device signals from a common location are different from the event location and the event location is changed in response.

The members eventually disperse in step 230, for example by traveling to separate and different locations, and the event ends in step 235. The captured media elements are communicated and received at the same time or after the event definition in step 240. The received media are associated and stored into a media-event collection in step 250 for subsequent use. The media elements are received, for example by a computer server connected to a communication network such as the internet and accessible through wired or wireless communication channels, such as local area networks, cellular communication networks, and point-to-point networks. Such communication channels can include: Ethernet, WiFi, or Bluetooth communication. Once the media elements are associated and stored in a media-event collection, they are used to define a product in step 260 and distributed in step 265.

Media products can be automatically defined and distributed (e.g. by a computer server of a service provider), or one or more group members can define and distribute the media products. Alternatively, another person, for example a professional graphic artist not part of the group can define and distribute a media product based on the media-event collection. Media products can be edited and refined by group members (e.g. in step 255).

According to various methods of the present invention, the event is defined in various ways in response to receiving one or more media-capture-device signals having the event location. As noted above, the event can be pre-specified and the event defined when media-capture signals (e.g. location signals or media elements having location capture information) from different members match the event location. Alternatively, the media-capture signals can indicate a common location that is not pre-determined. In further embodiments, the event is defined when a pre-determined number of people arrive at a pre-specified location or a common location. Alternatively, the event is defined when a pre-determined percentage of members in a group arrive at the event location or a common location. The group can be determined by the members themselves joining a group. Alternatively, the members are part of a group in view of whom they are or where they live. For example, a sporting event is defined when a number of people are at a sporting venue at the same time. The members of the group, in this example, are simply the people who have media-capture devices participating in an event service. Alternatively, a group is more exclusive, for example part of a family, and an event is defined when a number or percentage of the family congregate at a common location, for example, for a wedding.

An event can also be defined in response to both time and location. For example, an event is defined when members arrive at a location at a specified time, for example a pre-defined event time such as for a wedding or party or other event having a known, scheduled time. An end time or time-span allotment (amount of time) can also be specified, so that an event is terminated when participants disperse, the end time is reached, or the time elapses. Alternatively, an event is defined after a pre-specified delay time following the time when participants' locations coincide.

Figure 3:
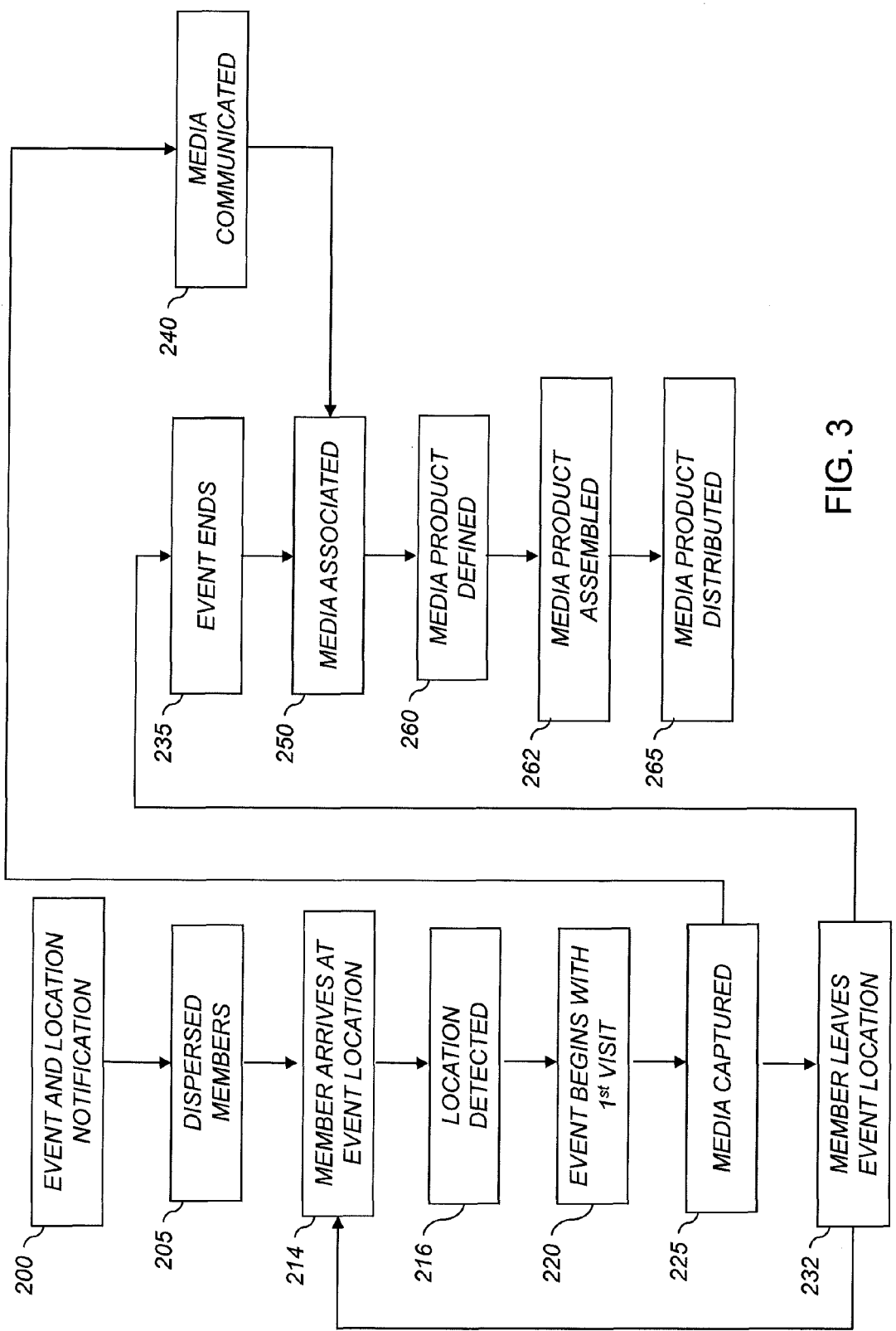
FIG. 3 is a flow diagram illustrating a method according to yet another embodiment of the present invention.

In a further embodiment of the present invention illustrated in FIG. 3, members arrive at an event location at different times. For example, an event can involve a known number of different members recording the event at different times at the event location. In this case, an event is specified in step 200 while members of a group are geographically dispersed in step 205. Subsequently, a member arrives at the event location in step 214, for example by traveling to the event location. The proximity of the member to the event location is detected in step 216 with media-capture device signals and, in response, an event is defined and begins in step 220. The event is recorded in step 225 by the group member employing a media-capture device to capture media elements, such as images, videos, audio, or text such as written descriptions. In one embodiment, the member leaves the event location (in step 232). Alternatively, the member can remain while another member arrives (step 214) and repeats the process until all members have arrived, thereby terminating the event (step 235). Alternatively, the event can end when all of the members leave the event location (not shown). The media are communicated in step 240 during or after the event and the media elements associated with the media-event collection in step 250. A media product can be defined (step 260) and distributed (step 265).

An event location can be specified in a variety of ways. A location can be latitude and longitude or a GPS location. Since physical people cannot be in the exact same location, a location is understood to include an area. The size of an area can simply reflect the precision of a location measurement (e.g. within ten meters) or can include a pre-determined distance from a precise location, for example within 10, 50, or 100 meters. Such a distance can be communicated to and received by participants or an event service and used to determine whether a media-capture location is at the event location or not. Such a determination can be made by comparing the media-capture location to the event location and determining whether the two locations are within the pre-determined distance of each other. Such measurements and calculations are known in the computing arts and can be computed by processors executing programs.

Alternatively, an event location is defined by the locations of the media-capture devices of the members. As members approach an event location or a common location, at some point they stop approaching a common location. The combined locations of the media-capture devices can define the event location. The event location is thus the area defined by the closest proximity of the media-capture devices as indicated by the media-capture device signals. Referring to FIG. 12, members are initially dispersed in step 205, they move toward a common location in step 270 and then stop moving toward a common location in step 275 to begin a defined event (step 220). The locations of the media-capture devices as indicated by the media-capture signals specify an area having an event boundary step 280 within which the event location is specified. The event boundary (step 280) is, for example, specified as a convex hull including the locations. Such image-processing and area specification algorithms are known in the art.

In various embodiments of the present invention, members of a group each have an identified media-capture device for capturing media with capture location, capture time information, and identification information. The group can be voluntarily defined by its members, for example by associating in social media networks. The group can interact through social media or media-sharing services provided by internet-connected service providers having computer servers that interact with the members' media-capture devices. The service provider can provide media-storage facilities, web-site services, application software for the media-capture devices, as well as software-enabled media services and media-event collection services using network-connected computer and storage servers.

Figure 4B:
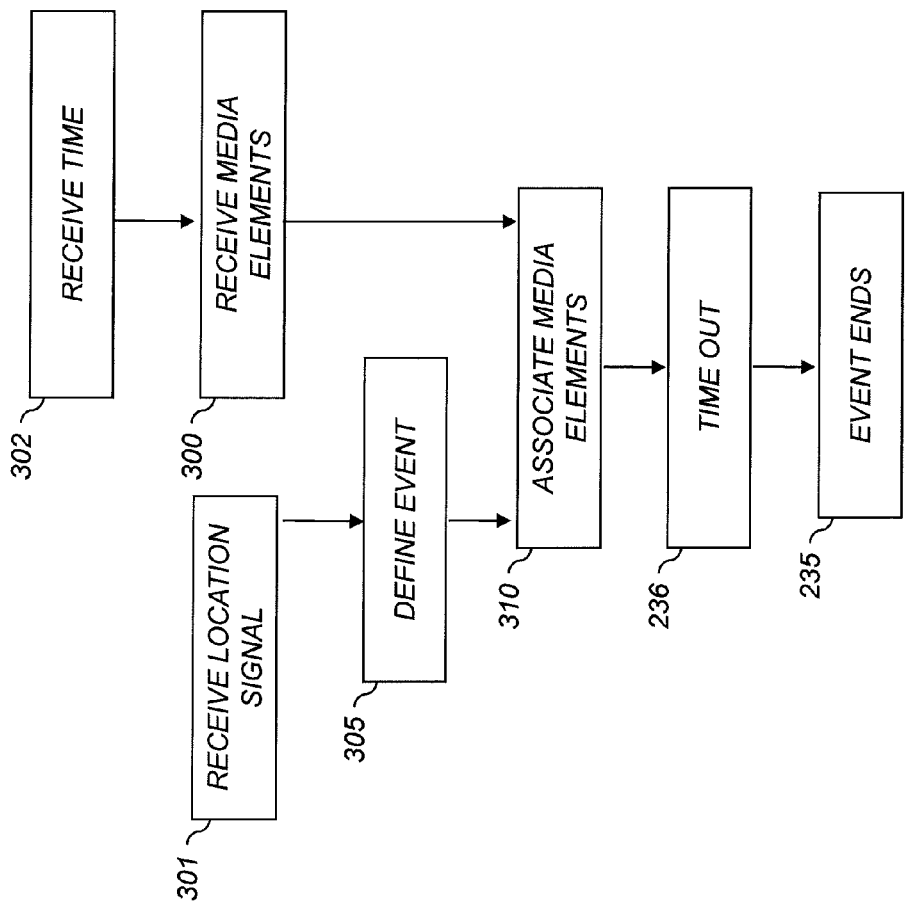
FIGS. 4A and 4B are flow diagrams illustrating various methods according to embodiments of the present invention.
Figure 4A:
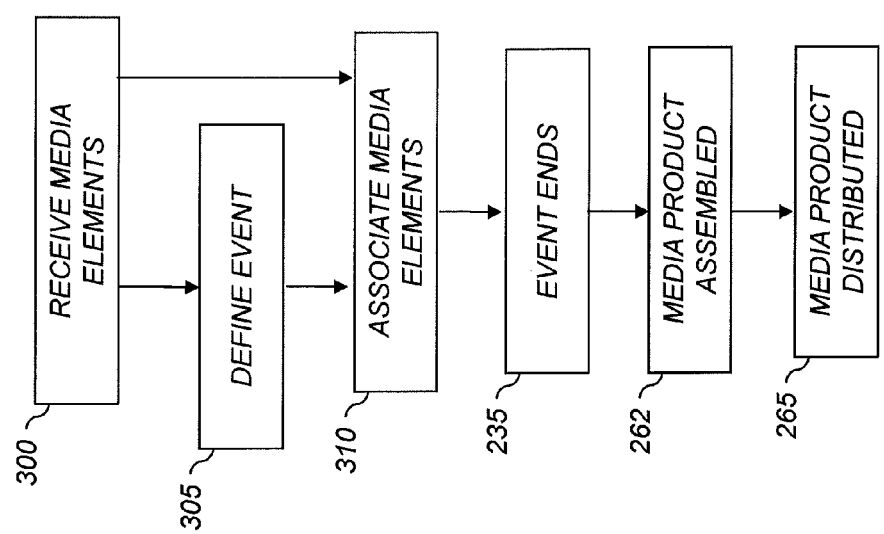

Referring to FIG. 4A, according to an embodiment of the present invention, a method for making a media collection associated with an event having an event location includes using a processor to receive one or more media elements from each of a plurality of media-capture devices, each media element having a capture location, in step 300. The event is defined in response to receiving one or more media-capture-device signals having the event location in step 305 and the media elements having the event location received at the same time or after the event definition associated with a stored media-event collection corresponding to the event for subsequent use in step 310. The defined event ends, for example through the physical dispersal of its members or a time restriction placed on the event, in step 235. A media product is assembled from the media elements in the media-event collection in step 262 and distributed in step 265.

Referring to FIG. 4B, according to another embodiment of the present invention using a time restriction in conjunction with an event location, a method for making a media collection associated with an event having an event location includes using a processor to receive a specified time in step 302, and one or more media elements from each of a plurality of media-capture devices, each media element having a capture location, in step 300. A location signal (e.g. from a media-capture device signal) is received in step 301. The event is defined in response to receiving one or more media-capture-device signals having the event location in step 305 and the media elements having the event location received at the same time or after the event definition associated with a stored media-event collection corresponding to the event for subsequent use in step 310. In step 236 a time-out terminates the event and the event ends in step 235.

Figure 6:
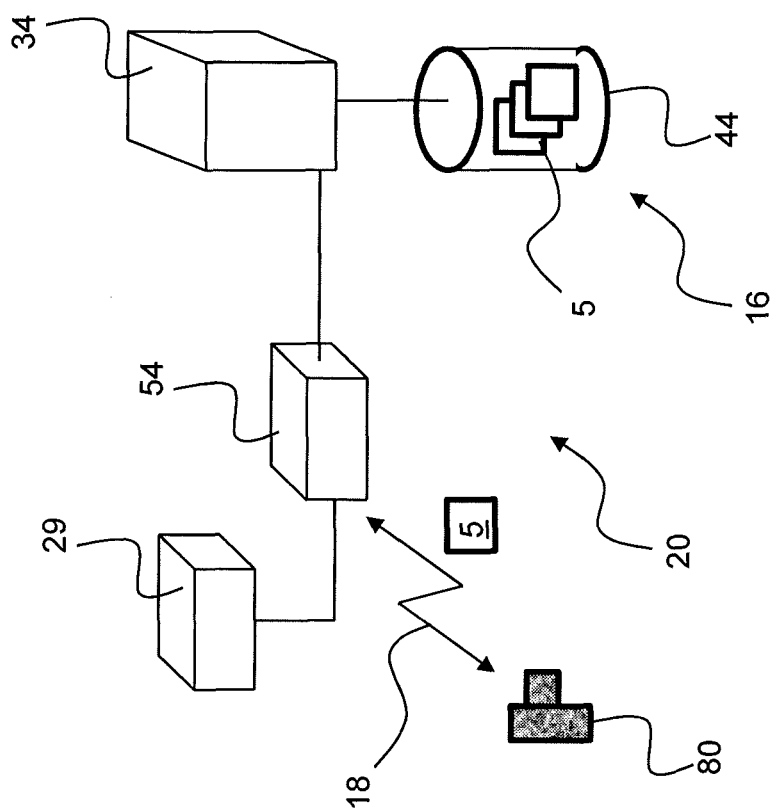
FIG. 6 is a schematic of a system useful with the present invention.
Figure 5:
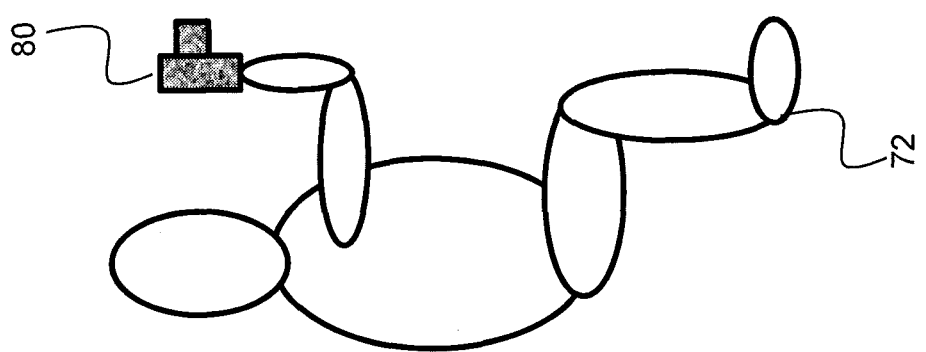
FIG. 5 is a schematic of a user photographing a scene according to a method of the present invention.

FIG. 5 illustrates a user 72 using a mobile media-capture device 80 to capture media, e.g. pictures at an event location. As shown in FIG. 6, the mobile media-capture device 80 communicates media elements 5 such as digital images through a communication channel 18 (e.g. a computer network such as the internet) to a system 20. The system 20 (e.g. internet-connected computer server) receives the communicated media elements 5 with a communication system 54. A processor 34 analyzes the media elements to associate the appropriate media elements with a media-event collection stored in a storage system 16, for example a disk drive 44.

Depending on the media elements received, the processor 34 can define an event and instantiate a corresponding media-event collection. Alternatively, an event coordinator, for example a member of the group, can define the event, location, or time and the media-event collection. The event coordinator can interact with the system 20 through a website controlled by the processor 34 and designed for the purpose of event specification, media-element collection, media-element analysis, and media-event collection storage. The servers and software for enabling such websites are within the scope of the computer and network arts.

In this embodiment, referring to FIG. 13, the computer server can notify group members of an event and event location in step 200 and receives media-capture device signals specifying the media-capture device locations to define the event in step 305. Media elements 5 are received in step 300. If the capture location matches the event location (step 290), the received media element is associated with the media-event collection in step 310. The process is repeated until the event is terminated (not shown). Media elements 5 having a capture time can also be received. The capture time of the media element 5 is compared to a time at which the event was defined, and, if the capture time is the same as or after the event definition time, the media element 5 is associated with the corresponding stored media event collection. The system 20 can also receive selection or editing instructions from one or more of the group members for one or more media elements 5 in the media collection or for a media product including at least a portion of the media collection and perform the selection or editing instructions. Communication, user-interaction, processing, and storage are known in the computer arts.

The system 20 can support multiple events at different locations for different groups. Hence, it is helpful if the media-capture devices are identified and associated with members who are, in turn, associated into identified groups. Each event can then be associated with the corresponding group, members, media-capture devices, and media-event locations.

Figure 14:
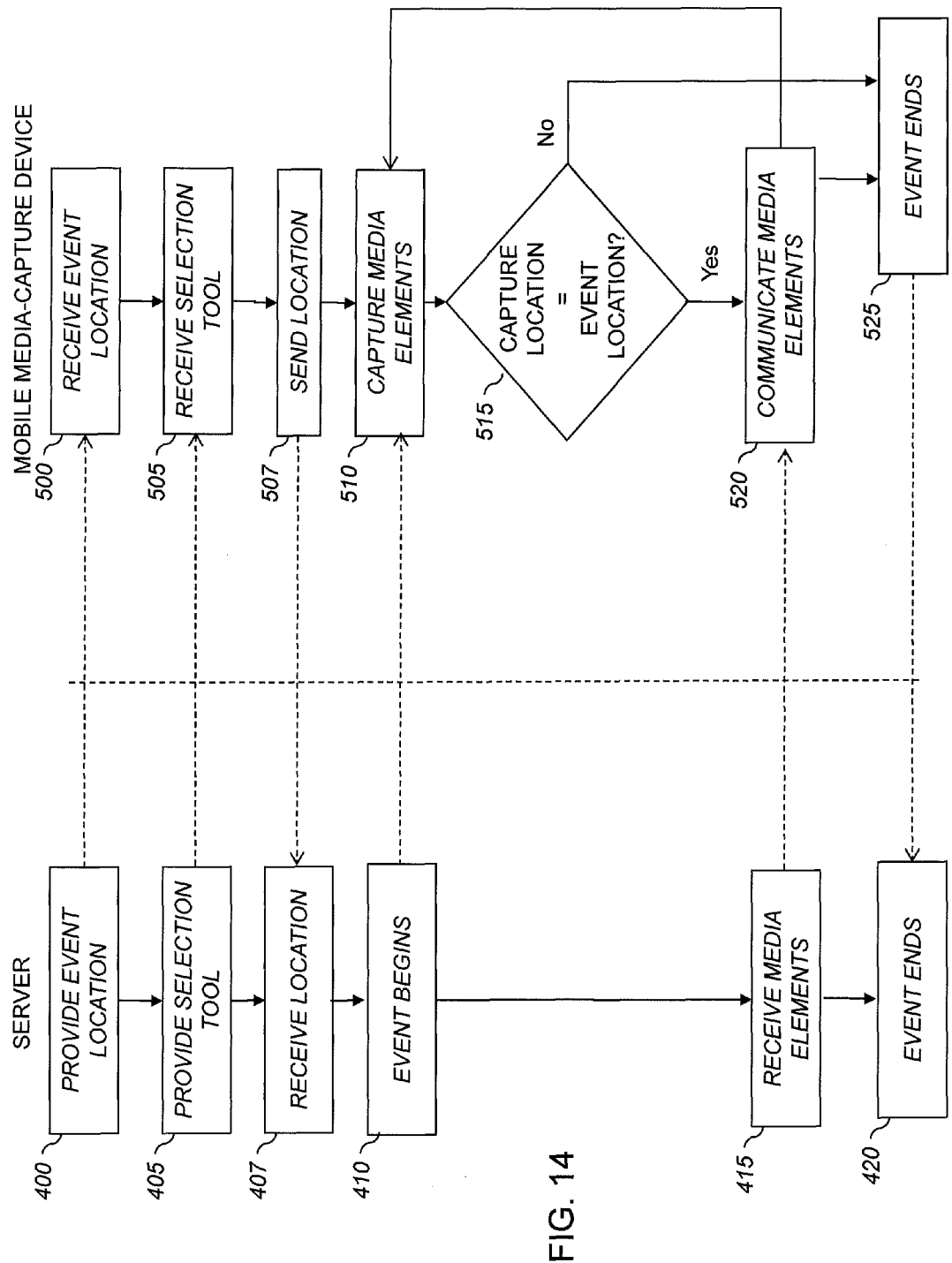
FIG. 14 is a flow diagram illustrating client/server methods according to an embodiment of the present invention.

In another embodiment of the present invention and as illustrated in FIG. 14, the media-capture device (e.g. 80) employs a tool provided by the computer system 20 to distribute the image analysis task to the media-capture devices of group members. An event location is provided to a computer server in step 400 (for example by an event coordinator). The event location and a selection tool are provided to one or more media-capture devices in steps 400 and 405. The provided selection tool is operable to compare the capture location of a media element 5 to the communicated event location, and, if the capture location corresponds to the event location, communicate the media element 5. The selection tool can be a software application tool that executes on a processor of the media-capture device (e.g. 80).

The event location is received by the mobile media-capture device in step 500 and the selection tool in step 505. The media-capture device (e.g. 80) sends media-capture device signals indicating the media-capture device location in step 507 that are received by the computer server in step 407. The beginning of the event is signaled in step 410 and media elements 5 are captured in step 510. The selection tool is operated so that, in this case, the capture location is compared to the event location in step 515. If media elements 5 are captured before the event begins, they are ignored. If a match is found after the event begins, the media element 5 is communicated in step 520 to the computer system 20 that receives the media element in step 415. The process is repeated until the capture location no longer matches and the event ends (step 525). The event end is communicated to the computer server in step 420.

In an alternative method of the present invention, the media-capture device (e.g. 80) is not informed of the event beginning and simply communicates media elements 5 having a capture location matching the event location, for example if a spontaneous common location is used to define the event. The computer system 20 then determines if the matched media elements 5 are associated with the media-event collection.

In another embodiment, the event only ends for the specific media-capture device (e.g. 80) that is no longer at the event location. The event can continue for other media-capture devices that continue the process until the event ends for the group and the media-collection is complete. In yet another embodiment, an event time at which the event was defined is communicated and the selection tool is operable to compare the capture time of a media element 5 to the communicated event time, and, if the capture time corresponds to the event time, communicate the media element 5.

Figure 15:
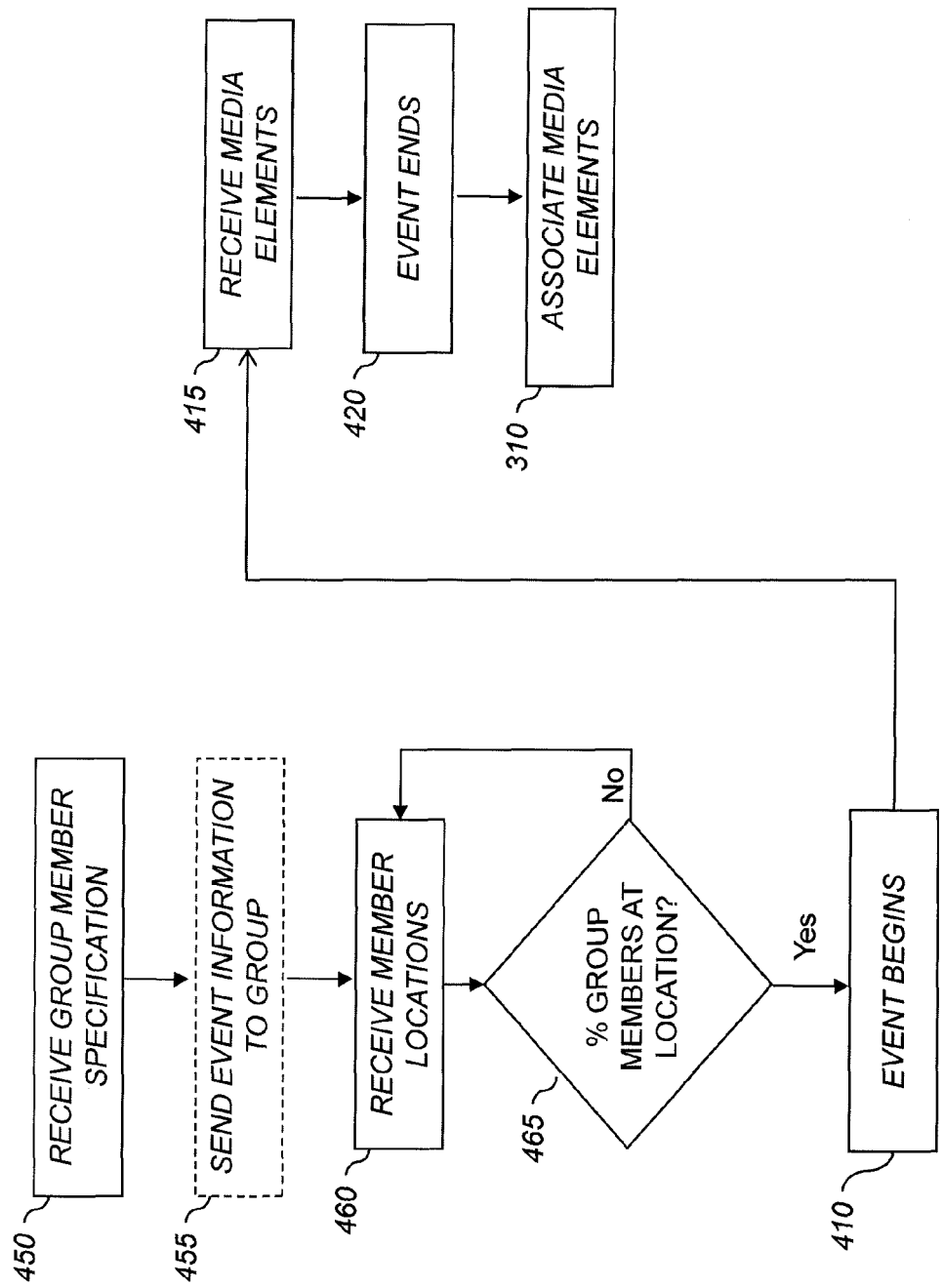
FIG. 15 is a flow diagram illustrating a method according to yet another embodiment of the present invention.

Event participants can be members of a group, for example a general group such as cell-phone owners having an account with a service provider, or a self-selected group such as a self-selected on-line group in a social-media or media-sharing community. In an embodiment of the present invention illustrated in FIG. 15, a method for making a media collection associated with an event having an event location includes receiving a specification of members in a group in step 450. Event information can be sent as a message to one or more of the group members in step 455, such as event location or time. By monitoring media-capture device signals identified with the group members (e.g. from media elements with a capture location or from a location signal), the location of the members is received (step 460, corresponding to step 407 in FIG. 14). An event is defined in response to receiving one or more media-capture-device signals having the event location from group members in step 410, for example once a pre-determined number or percentage of the group members arrives at an event location (or an unspecified common location that is then defined as the event location) in step 465. Media elements 5 having a capture location are received using a processor in step 415 until the event ends in step 420 (e.g. when members disperse or a time requirement is met). Media elements 5 having the event location received at the same time or after the event definition are associated with a stored media event collection corresponding to the event for subsequent use in step 310.

In further embodiments of the present invention, media-capture device signals are received from each group member that sequentially visits the event location and terminates the event when some or all of the group members have left the event location.

In one embodiment of the present invention, an event coordinator provides event information, such as location, event type, or event time. In this case, as shown in FIG. 16, a group specification is received in step 450 and event information received from one or more group members or another individual in step 456, for example by email or through interaction with a member through a website interaction or social-media system.

As noted above, group members' proximity can be detected in a variety of ways. As shown in FIG. 16, group members can employ media-capture devices that communicate directly and locally in step 470. When enough group members communicate locally, the event begins (step 410).

Referring to FIG. 17, in another embodiment of the present invention, users become members of a group by registering with the group (step 550) and mutually communicating their identity (step 551), for example within a social media or image sharing on-line service provider. Users can send or receive event signals to or from other group members in step 555 (corresponding to step 500 in FIG. 14), for example event information including a specified event time, time span, or distance, event location, or a group identifier. The user receives a selection tool for the media-capture device (e.g. 80) for selecting captured media element(s) 5 that have an associated capture location corresponding to the received event signal in step 505 (also in FIG. 14). As is illustrated in FIG. 14, the user captures one or more media element(s) 5 with a media-capture device (e.g. 80), the media element 5 having an associated capture location (step 510), the selection tool is operated (step 515), and one or more selected media element(s) are communicated to a media-element collection device (step 520).

The selection tool can select captured media element(s) 5 when a capture time of the media element 5 is at or after the specified time, a capture time of the media element 5 is within the time span, or a capture location of the media element 5 is within the distance from the event signal. In an embodiment, the selection is done by executing a software application on a processor in the media-capture device (e.g. 80).

Users can communicate an identifier (or a media-capture device identification) in step 551 (FIG. 17) to other group members or a remote service provider. Identity information can be used to control and secure communications between group member, the service provider, and others.

Prior-art methods operate on a pre-existing collection of images to segment them into events. Inherent in this process is the acquisition of numerous images or other media elements that are not relevant to a specific event. Therefore, if an event-related product is desired, it is necessary to process and analyze the images in an image collection to determine events and which images are relevant to the event. In contrast, the present invention provides a method for acquiring only those images or other media elements in an image collection relevant to an event, thereby reducing the amount of communication and storage necessary for acquired images unrelated to the event and eliminating the image processing and analysis necessary for segmenting images into events.

According to the present invention, an image product, photographic product, or photo-product is a printed or electronic media product that includes multiple images incorporated into an image-related object, such as for example a photo-book, photo-album, a photo-card, a picture greeting card, a photo-collage, a picture mug, on-line albums, movies, photo slideshows, photo-blogs, or other image-bearing products. In various embodiments of the present invention, an image product is a media product that can include printed images, for example images printed on photographic paper, cardboard, writing paper, textiles, ceramics, rubber such as foam rubber, or polymers. These printed images can be assembled or bound into image products. In an alternative embodiment, the media product can be an electronic image product suitable for display on an electronic display by a computing device and stored as a file, or multiple files, in an electronic storage system such as a computer-controlled disk drive or solid-state memory. Such image products can include, for example, photobooks, collages, or slide shows that include one or more images with or without ancillary images such as templates, backgrounds, clip art and the like. In various embodiments, an image product includes a single still image, multiple still images, or video images and can include other sensory modalities such as sound or text. A variety of these various media components are combined to create a media product that includes multiple media elements.

In an embodiment, the media products include images that are displayed by a computer on a display, for example as a single image or by sequentially displaying multiple pages in the product together with outputting any other related product information such as sound or text. Such display is interactively controlled by a user. Such display devices and media products are known in the art as are user interfaces for controlling the viewing of media products on a display. The media products are distributed and displayed on a display of a media-capture device.

Partially complete media products including captured media elements can be distributed to event participants during an event. In a further embodiment of the present invention, a media product derived from the media-event collection can be distributed in response to a subsequent event, for example a media product is produced in response to a group at a location and the media product distributed in response to the same group reconvening at the same location. Alternatively, the media product is distributed to a group member in response to the group member returning to the event location.

In one embodiment of the present invention, the various methods of the present invention are performed automatically using, for example, computer systems such as those described further below. Tools and circuits for receiving still images, video, audio, text, and photo-product choices, e.g. using communication circuits and networks, are known, as are tools and circuits for manually selecting digital images and specifying photo-products, e.g. by using software executing on a processor or interacting with an on-line computer server.

Figure 7:
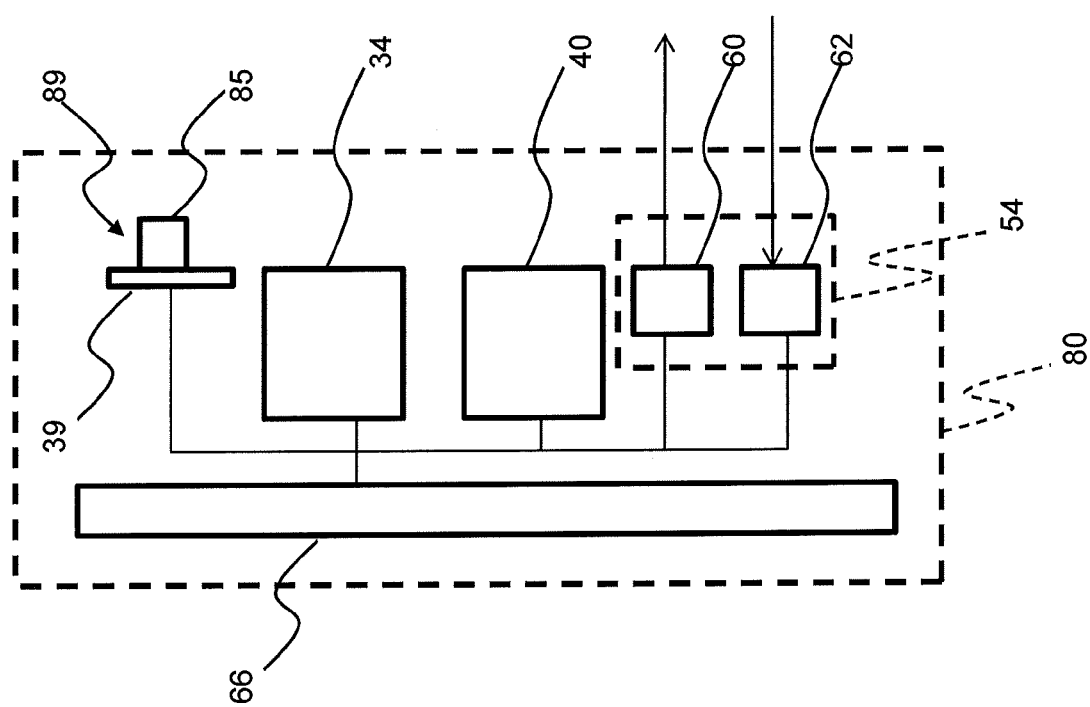
FIG. 7 is a schematic of a mobile communication device useful with the present invention.

The capture, transmission, and storage of digital information such as images, videos, audio, and text are well known in the art. For example, as shown in FIGS. 5 and 7, a user 72 can use a mobile communication device 80 that incorporates a digital camera 89 to photograph scenes and provide a media-capture device (e.g. 80). The mobile communication device 80 can be located at a suitable distance from the scene (as technically enabled by the digital camera 89 in the mobile communication device 80, for example using the optical lens system 85 shown in FIG. 7) for photographing scenes. Suitable mobile communication devices 80 are known in the art and can be used to communicate media elements 5 to remote servers through communication networks (e.g. cellular telephone networks and the internet) and to process information with built-in processors and memory, as shown in FIG. 6. Likewise, as shown in FIG. 6, systems that communicate with mobile communication devices 80 through wireless (e.g. WiFi, Bluetooth) or wired (e.g. wired Ethernet, USB) communication channels 18 are known.

A variety of systems can be used to implement the various methods of the present invention. Referring to FIG. 6, in one embodiment, such a system can include a communication system 54, printer 29, processor 34 and electronic storage and retrieval system 16 (e.g. a disk drive 44) communicatively interconnected. Such computer system components are well known in the art as are software applications, utilities, and programs that execute on the processor 34. The processor 34 is a single processor or can include multiple processors or distributed processors. Processing tasks can be done on a single processor or can be done using multiple, different processors.

The system for forming storage locations includes an electronic storage and retrieval system 16, a server processor 34 connected to one or more remote client computer(s) (e.g. mobile communication device 80) through a communication channel 18, the server processor 34 connected and having access to the electronic storage and retrieval system 16. The communication channel 18 can be a network and can interact with the processor 34 through a communication system 54.

The user 72 can photograph scenes and transmit the captured scenes through the communication channel 18 to the communication system 54 to be stored by the processor 34 on the disk drive 44 in the electronic storage and retrieval system 16 as a digital media element 5, such as a digital image.

The server processor 34 can include circuits to transmit and receive information to and from a remote client computer (e.g. mobile communication device 80), receive digital media element 5 from the remote client computer mobile communication device 80 through the communication network 18 and store the received digital media element 5 in the electronic storage and retrieval system 16. The server processor 34 also includes ways to receive references or receive photographs. Computer system components for storing, communicating, retrieving, and processing digital images are known in the art and discussed in greater detail with respect to FIGS. 9-11 below. The storage of digital information is also known in the computer and digital communication network arts.

Referring in more detail to the mobile communication system 80, as shown in FIG. 7, a mobile communication system 80 useful in various embodiments of the present invention as a media-capture device can include a display 66 connected to a processor 34, memory 40, communication system 54 including a transmitter 60 and a receiver 62, and an image sensor 39 with an optical lens system 85 forming a digital camera 89. The processor 34 can execute software stored in the memory 40 to acquire digital media element 5 with the digital camera 89, display the digital media element 5 on the display 66, store the digital media element 5 in the memory 40, or transmit the digital media element 5. The processor 34 can also receive software from a network storage device or server and execute the received software. A digital media element 5 can be a scene or an image of a printed or displayed thumbnail image. Such image capture, display, and storage software is known.

FIG. 8 is a perspective of mobile communication system 80a and 80b that includes a display 66 together with a local input mechanism 68 such as a local keyboard 68a of mobile communication system 80a. Mobile communication system 80b includes a display 66a that incorporates a touch-screen providing local input mechanism 68. Both mobile communication devices 80a that include keyboards 68a or mobile communication devices 80b that include displays with touch-screens 66a are known in the art. As shown in FIG. 6, a mobile communication device 80 can communicate through a communication channel 18, either through wireless or wired networks, or through a point-to-point communication device (e.g. 80), with a remote display to display images, for example, on a larger display than is present on the mobile communication device itself.

Embodiments of the present invention can be implemented using a variety of computers and computer systems illustrated in FIGS. 9, 10 and 11 as discussed further below. In one embodiment, for example, a portable computer with media capture and cellular telephony capability executing a software application can provide a suitable media-capture device for capturing and communicating media. Although illustrated as a relatively non-portable desktop device, the elements of FIG. 11 can also be incorporated into mobile computing systems such as a media-capture device or mobile communications system 80.

In another embodiment, a computer server operated by a service provider can provide web pages that are served over a network to a remote client computer such as a media-capture device. The web pages can permit a user of the remote client computer to provide digital images and photo-product choices. Applications provided by the web server to a remote client can enable capture, communication, and presentation of selected media elements, either as stand-alone software tools or provided through html, Java, or other known-internet interactive tools. A server computer can provide graphical user interface display elements and functions to a remote client computer connected to the server computer through a computer network such as the internet. The remote client computer can include a display having a graphic user interface (GUI) including a user-interactive GUI pointing device; and a plurality of media elements communicated to and stored on the server computer, communicated to the remote client computer, and displayed on the GUI.

Computers and computer systems are stored program machines that execute software programs to implement desired functions. According to a embodiment of the present invention, a software program executing on a computer with a display and graphic user interface (GUI) including a user-interactive GUI pointing device includes software for capturing, communicating, storing, and displaying a plurality of media elements having images on the GUI and for performing the steps of the various methods described above.

Figure 9:
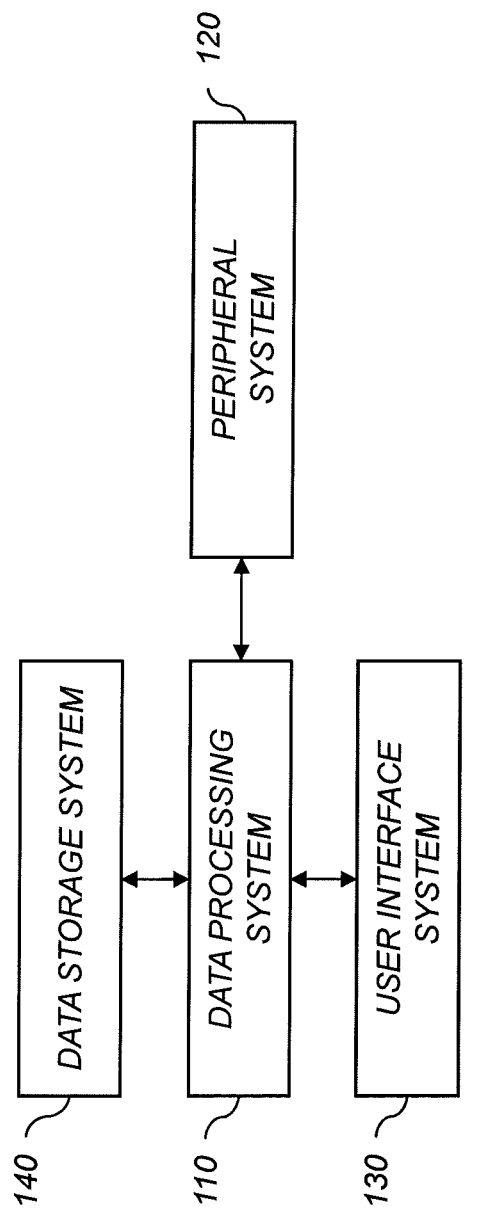
FIG. 9 is a simplified schematic of a computer system useful for the present invention.

FIG. 9 is a high-level diagram showing the components of a system useful for various embodiments of the present invention. For example, the system is useful for a mobile communication device 80 or a computer server. The system includes a data-processing system 110, a peripheral system 120, a user-interface system 130, and a data-storage system 140. The peripheral system 120, the user-interface system 130 and the data-storage system 140 are communicatively connected to the data-processing system 110. The system can be interconnected to other data-processing or data-storage systems through a network, for example the internet.

The data-processing system 110 includes one or more data-processing devices that implement the processes of the various embodiments of the present invention, including the example processes described herein. The phrases "data-processing device" or "data processor" are intended to include any data-processing device, such as a central processing unit ("CPU"), a desktop computer, a laptop computer, a mainframe computer, a personal digital assistant, a Blackberry™, tablet computer, a digital camera, a digital picture frame, cellular phone, a smart phone, or any other device for processing data, managing data, communicating data, or handling data, whether implemented with electrical, magnetic, optical, biological components, or otherwise.

The data-storage system 140 includes one or more processor-accessible memories configured to store information, including the information needed to execute the processes of the various embodiments of the present invention, including the example processes described herein. The data-storage system 140 can be a distributed processor-accessible memory system including multiple processor-accessible memories communicatively connected to the data-processing system 110 via a plurality of computers or devices. On the other hand, the data-storage system 140 need not be a distributed processor-accessible memory system and, consequently, can include one or more processor-accessible memories located within a single data processor or device.

The phrase "processor-accessible memory" is intended to include any processor-accessible data-storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors.

In this regard, although the data-storage system 140 is shown separately from the data-processing system 110, one skilled in the art will appreciate that the data-storage system 140 can be stored completely or partially within the data-processing system 110. Further in this regard, although the peripheral system 120 and the user-interface system 130 are shown separately from the data-processing system 110, one skilled in the art will appreciate that one or both of such systems can be stored completely or partially within the data-processing system 110.

The peripheral system 120 can include one or more devices configured to provide digital content records such as media elements to the data-processing system 110. For example, the peripheral system 120 can include digital still cameras, digital video cameras, cellular phones, smart phones, audio recorders, or other information-recording devices. The data-processing system 110, upon receipt of digital content records from a device in the peripheral system 120, can store such digital content records in the data-storage system 140. Such records can include digital still images, digital video, audio recordings, and text stored as one or more components of one or more media elements 5.

The user-interface system 130 can include a mouse, a keyboard, a keypad, a touch screen, a voice-recognition system, another computer, or any device or combination of devices from which data is input to the data-processing system 110. In this regard, although the peripheral system 120 is shown separately from the user-interface system 130, the peripheral system 120 can be included as part of the user-interface system 130.

The user-interface system 130 also can include a display device, a processor-accessible memory, or any device or combination of devices to which data is output by the-data processing system 110. In this regard, if the user interface system 130 includes a processor-accessible memory, such memory can be part of the data-storage system 140 even though the user-interface system 130 and the data-storage system 140 are shown separately in FIG. 9.

Figure 11:
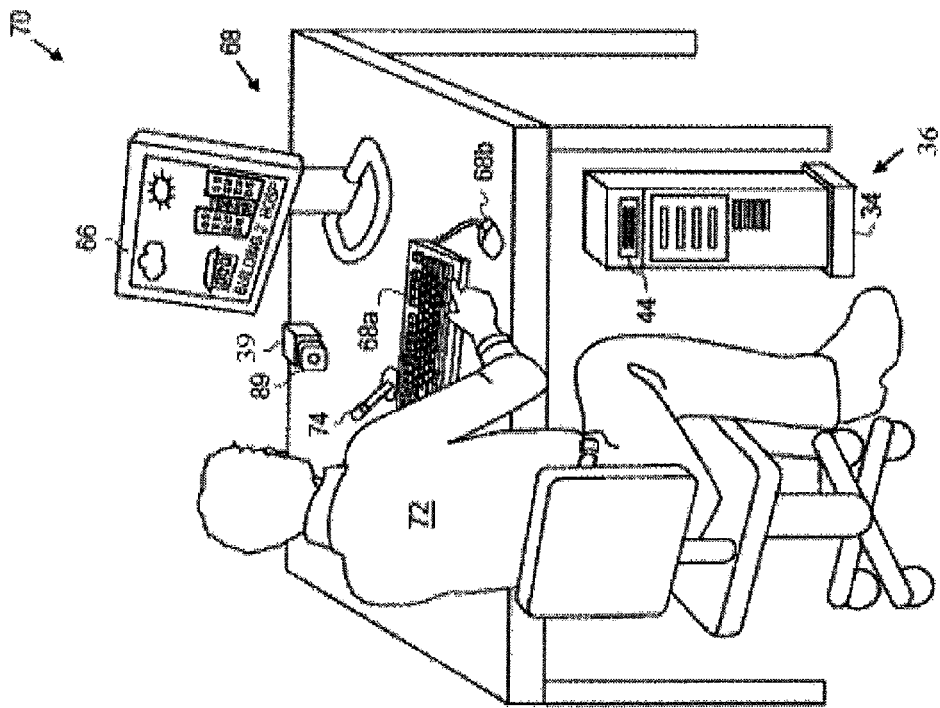
FIG. 11 is a schematic of another computer system useful for embodiments of the present invention.
Figure 10:
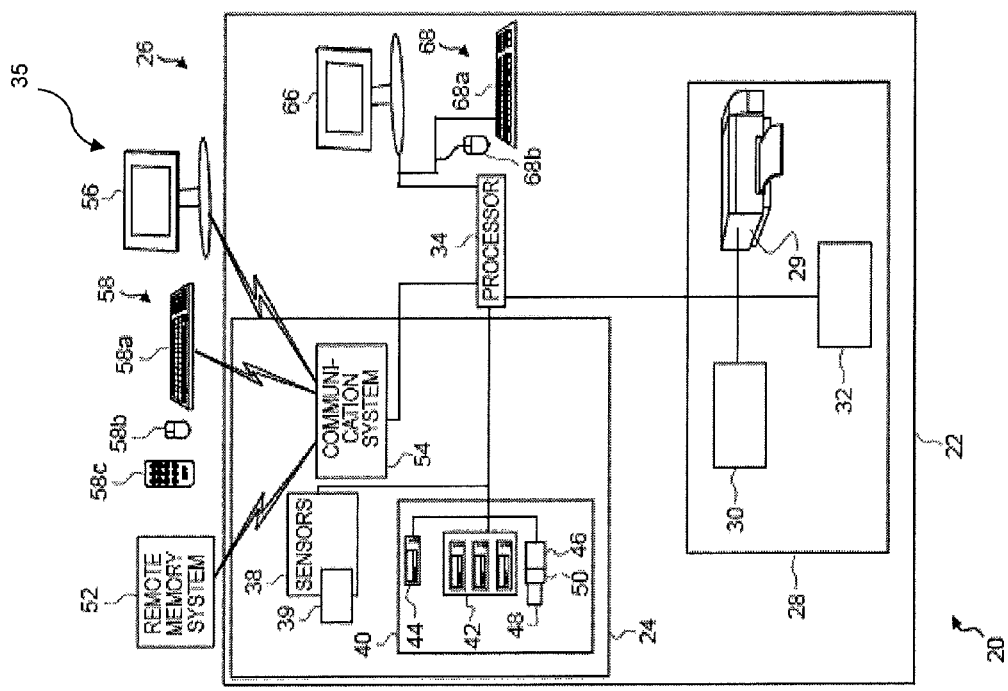
FIG. 10 is a schematic of a computer system useful for embodiments of the present invention.

Referring to FIGS. 10 and 11, computers, computer servers, and a communication system are illustrated together with various elements and components that are useful in accordance with various embodiments of the present invention. FIG. 10 illustrates an embodiment of an electronic system 20 that can be used in providing services to remote users, receiving, processing, and storing information such as media-event collections, and generating a media product. In the embodiment of FIG. 10, electronic system 20 includes a housing 22 and a source of content data files 24, a user input system 26 and an output system 28 connected to a processor 34. The source of content data files 24, user-input system 26 or output system 28 and processor 34 can be located within housing 22 as illustrated. In other embodiments, circuits and systems of the source of content data files 24, user input system 26 or output system 28 can be located in whole or in part outside of housing 22.

The source of content data files 24 can include any form of electronic or other circuit or system that can supply digital data to processor 34 from which processor 34 can derive images for use in forming an image-enhanced item. In this regard, the content data files can comprise, for example and without limitation, still images, image sequences, video graphics, audio recording, text, and computer-generated images. Source of content data files 24 can optionally capture images to create content data for use in content data files by use of capture devices located at, or connected to, electronic system 20 or can obtain content data files that have been prepared by or using other devices. In the embodiment of FIG. 10, source of content data files 24 includes sensors 38, a memory 40 and a communication system 54.

Sensors 38 are optional and can include light sensors, biometric sensors, magnetometers, orientation sensors, inertial sensors, and other sensors known in the art that can be used to detect conditions in the environment of system 20 and to convert this information into a form that can be used by processor 34 of system 20. Sensors 38 can also include one or more image sensors 39 that are adapted to capture images. Sensors 38 can also include biometric or other sensors for measuring involuntary physical and mental reactions such sensors 38 including, but not limited to, voice inflection, body movement, eye movement, pupil dilation, body temperature, and p4000 wave sensors. In addition, sensors 38 can measure magnetic fields to determine direction and orientation and inertial sensors to detect static and dynamic orientation.

Memory 40 can include conventional memory devices including solid-state, magnetic, optical or other data-storage devices. Memory 40 can be fixed within system 20 or it can be removable. In the embodiment of FIG. 10, system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the embodiment shown in FIG. 10, system 20 has a communication system 54 that in this embodiment is used to communicate with an optional remote memory system 52, an optional remote display 56, or optional remote input 58. The optional remote memory system 52, optional remote display 56, optional remote input 58A (i.e. keyboard) can be part of a remote system 35 having an input station 58 having remote input controls 58 (also referred to herein as "remote input 58"), can include a remote display 56, and that can communicate with communication system 54 wirelessly as illustrated or can communicate in a wired fashion. In an alternative embodiment, a local input station including either or both of a local display 66 and local input mechanism 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful embodiment, the system 20 can provide web access services to remotely connected computer systems (e.g. remote systems 35) that access the system 20 through a web browser. Alternatively, remote system 35 can provide web services to system 20 depending on the configurations of the systems.

User input system 26 provides a way for a user of system 20 to provide instructions to processor 34. This permits such a user to make a designation of content data files to be used in generating an image-enhanced output product and to select an output form for the output product. User input system 26 can also be used for a variety of other purposes including, but not limited to, permitting a user to arrange, organize and edit content data files to be incorporated into the image-enhanced output product, to provide information about the user or audience, to provide annotation data such as voice and text data, to identify characters in the content data files, and to perform such other interactions with system 20 as will be described later.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 10, user input system 26 includes an optional remote input 58 including a remote keyboard 58a, a remote mouse 58b, and a remote control 58c and a local input mechanism 68 including a local keyboard 68a and a local mouse 68b.

Remote input 58 can take a variety of forms, including, but not limited to, the remote keyboard 58a, remote mouse 58b or remote control handheld device 58c illustrated in FIG. 10. Similarly, local input 68 can take a variety of forms. In the embodiment of FIG. 10, local display 66 and local user input 68 are shown directly connected to processor 34.

As is illustrated in FIG. 11, local user input 68 can take the form of a home computer having a processor 34 and disk storage 44, an editing studio, or kiosk 70 (hereafter also referred to as an "editing area 70") that can also be a remote system 35 or system 20. In this illustration, a user 72 is seated before a console comprising local keyboard 68a and mouse 68b and a local display 66 which is capable, for example, of displaying multimedia content. As is also illustrated in FIG. 11, editing area 70 can also have sensors 38 including, but not limited to, image sensors 39, audio sensors 74 and other sensors such as multispectral sensors that can monitor user 72 during a production session.

Referring back to FIG. 10, output system 28 is used for rendering images, text or other graphical representations in a manner that permits image-product designs to be combined with user items and converted into an image product. In this regard, output system 28 can comprise any conventional structure, system, or output device 32 that is known for printing or recording images, including, but not limited to, printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as a type that generates color images. However, it will be appreciated that this is not necessary and that the claimed methods and apparatuses herein can be practiced with a printer 29 that prints monotone images such as black and white, grayscale, or sepia toned images. As will be readily understood by those skilled in the art, a system 20 with which a user interacts to define a user-personalized image product can be separated from a remote system (e.g. 35) connected to a printer 29, so that the specification of the image product is remote from its production.

In certain embodiments, the source of content data files 24, user input system 26 and output system 28 can share components.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components. The system 20 of FIGS. 10 and 11 can be employed to make and display an image product according to a embodiment of the present invention.

The invention has been described in detail with particular reference to certain embodiments thereof, but it will be understood that variations and modifications can be effected within the spirit and scope of the invention.

PARTS LIST 5 media element
16 storage retrieval system
18 communication channel
20 system
22 housing
24 source of content data files
26 user input system
28 output system
29 printer
30 tangible surface
32 output device
34 processor
35 remote system
38 sensors
39 image sensors
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
60 transmitter
62 receiver
66 display
66a display
68 local input mechanism
68a local keyboard
68b local mouse
70 home computer, editing area, or kiosk
72 user
74 audio sensors
80 mobile communication device
80a, 80b mobile communication system 85 optical lens
89 digital camera
110 data processing system
120 peripheral system
130 user interface system
140 data storage system
200 event and location notification step
205 dispersed members step
210 members congregate at event location step
212 members congregate at common location step
214 member arrives at event location step
215 proximity detected step
216 location detected step
218 members move in concert to new common location step
220 event begins step
225 media captured step
230 members disperse step
232 member leaves event location step
235 event ends step
236 time out step
240 media communicated step
250 media associated step
255 optional media edited step
260 media product defined step
262 media product assembled step
265 media product distributed step
270 members move toward common location step
275 members stop moving toward common location step
280 event boundary defined step
290 capture location test step
300 receive media elements step
301 receive location signal step
302 receive time step
305 defined event step
310 associate media elements step
400 provide event location step
405 provide selection tool step
407 receive location step
410 event begins step
415 receive media elements step
420 event ends step
450 receive group member specification step
455 send event information to group step
456 receive event information from group step
460 receive member locations step
465 group members location test step
470 group members communication test step
500 receive event location step
505 receive selection tool step
507 send location step
510 capture media elements step
515 capture location test/selection tool operation step
520 communicate media elements step
525 event ends step
550 register with group step
551 communicate identity step
555 send event information to group step

The invention claimed is:

1. A method fir making a media collection associated with an event having an event location, comprising:
receiving a specification of members in a group;
receiving one or more media elements from each of a plurality of media-capture devices, wherein each media element includes a capture location describing a first geographical location at which the media element was captured and a capture time describing a time at which the media element was captured;
receiving one or more media-capture-device signals from each of the plurality of media-capture devices, wherein each media-capture-device signal indicates a second geographical location at which the corresponding media-capture device is located;
defining a beginning time of the event directly in response to receiving one or more media-capture-device signals from one or more of the group members indicating that one or more corresponding media-capture devices are at the event location; and
associating one or more received media elements that each have the capture location at the event location and the capture time the same time as or after the defined beginning time of the event with a stored media event collection corresponding to the event.

2. The method according to claim 1, further including sequentially receiving a media-capture device signal from each group member that sequentially visits the event location and terminates the event when the group members have left the event location.

3. The method according to claim 1, further including communicating a message to one or more of the group members.

4. The method according to claim 1, further including communicating a message including an event location, a location of one or more group members, a group identifier, or a time to one or more of the group members.

5. The method according to claim 1, further including defining the beginning time of the event in response to receiving media-capture-device signals from a percentage of the group members indicating that the corresponding media-capture devices are at the event location.

6. The method according to claim 1, further including defining the beginning time of the event in response to receiving media-capture-device signals from a pre-determined number of group members indicating that the corresponding media—capture devices are at the event location.

7. The method according to claim 1, further including defining the beginning time of the event in response to receiving media-capture-device signals from a pre-defined number of the plurality of media-capture devices in the group when the media-capture-device signals stop moving toward the event location.

8. The method according to claim 1, further including defining the beginning time of the event in response to receiving media-capture-device signals from a pre-defined number of the plurality of media-capture devices in the group when the media-capture devices in the group are within audible range of each other, visual range of each other, or when a pre-defined number of the plurality of media-capture devices in the group are within local wireless network operational range of each other.

9. The method according to claim 1, further including providing the media collection, a reference to the media collection, a product including at least a portion of the media collection, or a reference to a product including at least a portion of the media collection to one or more of the group members.

10. The method according to claim 1, wherein each media-capture-device signal includes an identifier for the corresponding media-capture device.

11. The method according to claim 1, further including receiving selection or editing instructions from one or more of the group members for one or more media elements in the media collection or for a product including at least a portion of the media collection and performing the selection or editing instructions.

12. The method according to claim 1, further including providing the event location and a selection tool to one or more of the media-capture devices, wherein the provided selection tool is configured to compare the capture location of a media element to the event location, and, if the capture location is proximate to the event location, communicate the media element.

13. The method according to claim 12, further including providing the defined beginning time of the event to the one or more media-capture devices, and wherein the selection tool is further configured to compare the capture time of a media element to the beginning time of the event, and, if the capture time is proximate to the event time, communicate the media element.

14. The method according to claim 1, further including communicating a media product including one or more media elements to one or more members of the group during the event.

15. The method according to claim 1, further including communicating a media product including one or more media elements to one or more members of the group in response to one or more members of the group returning to the event location after the event.

16. The method according to claim 1, wherein the event location is pre-determined.

17. The method according to claim 1, wherein the event location is a common location where the members of the group congregate at spontaneously.

18. A non-transitory computer-readable medium storing instructions which, when executed by a processing device, cause the processing device to:
receive a specification of members in a group;
receive one or more media elements from each of a plurality of media-capture devices, wherein each media element includes a capture location describing a first geographical location at which the media element was captured and a capture time describing a time at which the media element was captured;
receive one or more media-capture-device signals from each of the plurality of media-capture devices, wherein each media-capture-device signal indicates a second geographical location at which the corresponding media-capture device is located;
define a beginning time of the event directly in response to receiving one or more media-capture-device signals from one or more of the group members indicating that one or more corresponding media-capture devices are at the event location; and
associate one or more received media elements that each have the capture location at the event location and the capture time the same time as or after the defined beginning time of the event with a stored media event collection corresponding to the event.

19. A system tier making a media collection associated with an event having an event location, comprising a processing device and a storage device, wherein
the processing device is communicatively connected to the storage device; and
the storage device is configured to store instructions to cause the processing device to:
receive a specification of members in a group;
receive one or more media elements from each of a plurality of media-capture devices, wherein each media element includes a capture location describing a first geographical location at which the media element was captured and a capture time describing a time at which the media element was captured;
receive one or more media-capture-device signals from each of the plurality of media-capture devices, wherein each media-capture-device signal indicates a second geographical location at which the corresponding media-capture device is located;
define a beginning time of the event directly in response to receiving one or more media-capture-device signals from one or more of the group members indicating that one or more corresponding media-capture devices are at the event location; and
associate one or more received media elements that each have the capture location at the event location and the capture time the same time as or after the defined beginning time attic event with a stored media event collection corresponding to the event.

* * * * *